US011639120B2

(12) United States Patent
Liu

(10) Patent No.: US 11,639,120 B2
(45) Date of Patent: May 2, 2023

(54) CHILD SAFETY SEAT

(71) Applicant: Bambino Prezioso Switzerland AG, Steinhausen (CH)

(72) Inventor: Zujian Liu, Dongguan (CN)

(73) Assignee: BABMINO PREZIOSO SWITZERLAND AG, Steinhausen (CH)

( * ) Notice: Subject to any disclaimer, the term of this patent is extended or adjusted under 35 U.S.C. 154(b) by 0 days.

(21) Appl. No.: 17/476,695

(22) Filed: Sep. 16, 2021

(65) Prior Publication Data

US 2022/0080864 A1    Mar. 17, 2022

(30) Foreign Application Priority Data

Sep. 17, 2020 (CN) .......................... 202010983196.6

(51) Int. Cl.
*B60N 2/28* (2006.01)
*B60N 2/26* (2006.01)

(52) U.S. Cl.
CPC .......... *B60N 2/2869* (2013.01); *B60N 2/265* (2013.01); *B60N 2/2821* (2013.01); *B60N 2002/2815* (2013.01)

(58) Field of Classification Search
CPC ................ B60N 2/2869; B60N 2/2821; B60N 2002/2815
See application file for complete search history.

(56) References Cited

U.S. PATENT DOCUMENTS

2005/0275276 A1* 12/2005 Patterson ............. B60N 2/2821
297/479
2007/0296254 A1   12/2007 Kahn
(Continued)

FOREIGN PATENT DOCUMENTS

CN         201998837 U    10/2011
CN         207711973 U    8/2018
(Continued)

OTHER PUBLICATIONS

Office Action issued in counterpart Japanese Patent Application No. 2021-149818, dated Nov. 1, 2022.
(Continued)

*Primary Examiner* — David R Dunn
*Assistant Examiner* — Tania Abraham
(74) *Attorney, Agent, or Firm* — Volpe Koenig

(57) ABSTRACT

A child safety seat comprising a base and a body rotatably connected to the base for providing a seating space. The base is rotatably connected to the body via a rotating shaft. The child safety seat further comprises an electrical pivoting structure including a base pivoting member for electrically connecting to a base electrical device in the base, and a body pivoting member for electrically connecting to a body electrical device in the body. The base pivoting member is coupled to the base and has a base conductive part. The body pivoting member is coupled to the body and has a body conductive part. The base conductive part and the body conductive part are rotatably and electrically connected in the rotating shaft. The base electrical device and the body electrical device are electrically connected to each other via electrical connection of the base conductive part and the body conductive part.

15 Claims, 4 Drawing Sheets

(56) References Cited

U.S. PATENT DOCUMENTS

| | | | | |
|---|---|---|---|---|
| 2008/0246316 A1* | 10/2008 | Carine | ............... | B60N 2/2812 |
| | | | | 297/217.2 |
| 2014/0292503 A1* | 10/2014 | Schoenberg | ......... | B60N 2/2869 |
| | | | | 340/438 |
| 2016/0207497 A1* | 7/2016 | Seal | ..................... | B60N 2/265 |
| 2016/0304004 A1* | 10/2016 | Sandbothe | ............ | B60R 21/013 |
| 2017/0021800 A1 | 1/2017 | Seibert | | |
| 2020/0346566 A1* | 11/2020 | Frank | ................... | B60N 2/289 |
| 2020/0346613 A1* | 11/2020 | Frank | ................... | B60N 2/2803 |
| 2021/0070244 A1* | 3/2021 | Guo | ..................... | G08B 21/22 |

FOREIGN PATENT DOCUMENTS

| | | |
|---|---|---|
| CN | 210337659 U | 4/2020 |
| CN | 111605452 A | 9/2020 |
| JP | 2018122618 A | 8/2018 |
| JP | 3218277 U | 10/2018 |
| JP | 2001272416 A | 10/2021 |

OTHER PUBLICATIONS

Office Action issued in counterpart Taiwanese Patent Application No. 110134786 dated Jul. 29, 2022.
Decision to Grant issued in Japanese Patent Application No. 2021-149818 dated Jan. 27, 2023.
Office Action issued in Taiwanese Patent Application No. 110134786 dated Dec. 5, 2022.

* cited by examiner

CHILD SAFETY SEAT

TECHNICAL FIELD

The disclosure relates to children's products, and particularly to a child safety seat.

BACKGROUND

In order to improve the safety performance of a child when he is sitting in a car, generally, a child safety seat is installed on a car seat. Among them, the 360-degree rotatable child safety seats are favored by many people for their cool appearances and simple operations. In order to further transmit the information of the rotation angle of the child safety seat directly to the user, most of the 360-degree rotatable child safety seats are provided with several electrical devices to achieve this purpose. However, since most of the electrical devices are electrically connected to each other by electrical cables, which will cause the cables to rotate with the rotation of the child safety seats, and in turn causes cable winding. Over time, the service life of electrical devices will be greatly reduced; thus, causing an unfavorable experience to the users.

In order to solve the shortcomings of the related art, there is a need for a rotatable child safety seat that can avoid cable winding.

SUMMARY

An object of the disclosure is to provide a child safety seat which is simple in structure and can avoid cable winding.

In order to achieve the above-mentioned objects, the disclosure provides a child safety seat comprising a base and a body rotatably connected to the base for providing a seating space. The base is rotatably connected to the body via a rotating shaft. The child safety seat further comprises an electrical pivoting structure which includes a base pivoting member for electrically connecting to a base electrical device in the base and a body pivoting member for electrically connecting to a body electrical device in the body; the base pivoting member is coupled to the base, the base pivoting member has a base conductive part; the body pivoting member is coupled to the body, the body pivoting member has a body conductive part; the base conductive part and the body conductive part are rotatably and electrically connected in the rotating shaft, the base electrical device and the body electrical device are electrically communicated with each other via electrical connection between the base conductive part and the body conductive part.

Compared with the related art, in the child safety seat of the disclosure, the base electrical device and the body electrical device are electrically connected to each other via an electrical pivoting structure, the electrical pivoting structure includes a base pivoting member for electrically connecting to a base electrical device in the base and a body pivoting member for electrically connecting to a body electrical device in the body; the body pivoting member is coupled to the body; the base pivoting member is coupled to the base, the body pivoting member has a body conductive part, the base pivoting member has a base conductive part; the base conductive part and the body conductive part are rotatably and electrically connected in the rotating shaft. When the child safety seat of the disclosure rotates, the base conductive part and the body conductive part may rotate synchronously with the rotation of the base and the body. Since the body pivoting member is coupled to the body, and the base pivoting member is coupled to the base, the body pivoting member is in a static state in respect to the body electrical device, and the base pivoting member is also in a static state in respect to the base electrical device. On the one hand, when the base electrical device and the body electrical device are directly connected to each other by the electrical pivoting structure, since there is no cable between the base electrical device and the body electrical device, cable winding will not occur, which can completely solve the winding problem caused by the use of cables in the prior art; moreover, on the other hand, when the body electrical device and the body pivoting member are electrically connected to each other by a cable, the base electrical device and the base pivoting member are also electrically connected to each other by a cable, since the body pivoting member is in a static state in respect to the body electrical device, and the base pivoting member is also in a static state in respect to the base electrical device, both the cable connected between the body pivoting member and the body electrical device and the cable connected between the base pivoting member and the base electrical device are stationary, that is, the cables will not move with the rotation of the child safety seat and will not be winded, so the problem of cable winding caused by the use of cables in the related art may be completely solved by the disclosure. Therefore, the child safety seat according to the disclosure is totally different from that of the related art in which the electrical devices are electrically connected to each other by directly using cables, in the present disclosure, the electrical devices are electrically connected to each other by the electrical pivoting structure, which is simple in structure and can avoid cable winding, and is suitable for widespread promotion and use.

Preferably, according to the disclosure, the base conductive part and the body conductive part form a conductive and rotatable pluggable structure.

Preferably, according to the disclosure, one of the base conductive part and the body conductive part has a conductive depression structure, and the other of the base conductive part and the body conductive part has a conductive protrusion structure being able to be plugged into and unplugged from the depression structure.

Preferably, according to the disclosure, the depression structure is covered with a first insulating shell, the protrusion structure is protruded out of the second insulating shell, the protrusion structure is plugged into the depression structure, and the second insulating shell and the first insulating shell are in an abutting contact.

Preferably, according to the disclosure, the abutting contact of the second insulating shell and the first insulating shell is structurally smooth.

Preferably, according to the disclosure, a bottom of the depression structure is provided with a depressed seat, and a top of the protrusion structure is provided with a tapered portion being cooperative with the depressed seat.

Preferably, according to the disclosure, the tapered portion has a chamfered structure. The chamfered structure has a certain guiding effect, which facilitates plugging the protrusion structure into the depression structure.

Preferably, according to the disclosure, the base pivoting member is electrically connected to the base electrical device via a cable.

Preferably, according to the disclosure, the body pivoting member is electrically connected to the body electrical device via a cable.

Preferably, according to the disclosure, the rotating shaft includes a rotating shaft body having a hollow structure, and two ends of the rotating shaft body extend outwardly so as to form a shoulder.

Preferably, according to the disclosure, the base conductive part and the body conductive part are accommodated in the hollow structure of the rotating shaft.

Preferably, according to the disclosure, a mounting hole which is cooperative with the rotating shaft is provided in the rotating connection position between the body and the base, and the rotating shaft is mounted in the mounting hole.

Preferably, according to the disclosure, the body pivoting member further includes a body connecting part for connecting to the body, and a plane where the body connecting part is located is orthogonal to a plane where the body conductive part is located.

Preferably, according to the disclosure, the base pivoting member further includes a base connecting part for connecting to the base, and a plane where the base connecting part is located is orthogonal to a plane where the base conductive part is located.

Preferably, according to the disclosure, the body electrical device is a detection device for detecting whether a top strap is tightened, and the base electrical device is an indicator for displaying tightening state information of the top strap.

DETAILED DESCRIPTION

In order to describe the technical content and structural features of the disclosure in more detail, the following detailed illustration is provided conjunction with the embodiments and the accompanying drawings.

Figure 1:
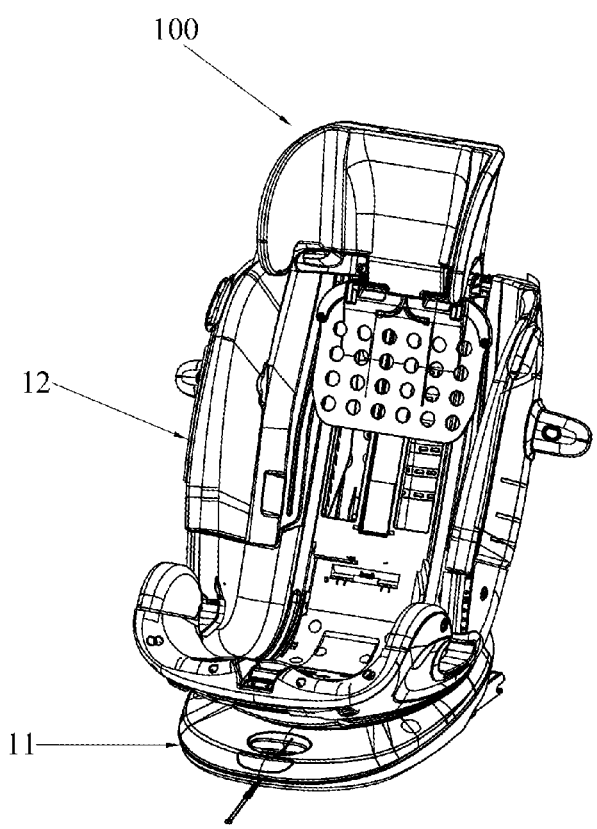
FIG. 1 is a schematic view of a structure of a child safety seat according to the disclosure.
Figure 2:
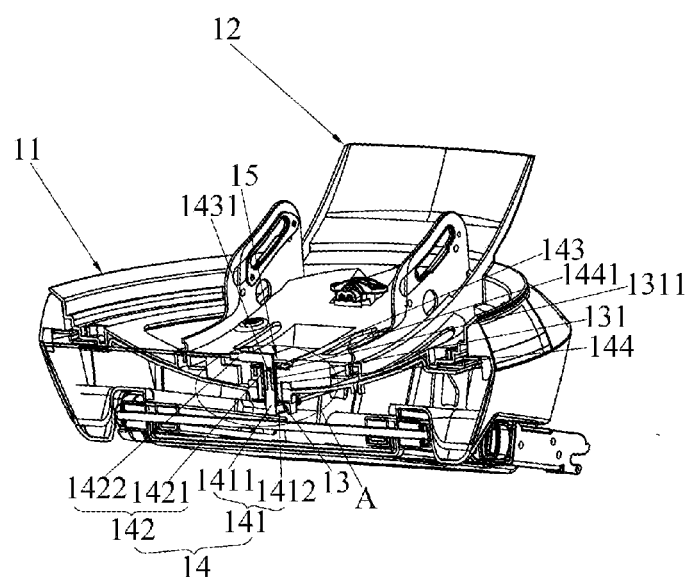
FIG. 2 is a cross-sectional view of the child safety seat according to the disclosure at a rotating shaft.

Referring to FIGS. 1-2, a child safety seat 100 according to the disclosure comprises a base 11 and a body 12 rotatably connected to the base 11 for providing a seating space. The base 11 is rotatably connected to the body 12 by a rotating shaft 13. In order to prevent cables connected between electrical devices of the child safety seat 100 from moving along with a rotation of the base 11 and the body 12, the child safety seat 100 according to the disclosure further comprises an electrical pivoting structure 14. The electrical pivoting structure 14 includes a base pivoting member 141 for electrically connecting to a base electrical device (not shown in FIGS. 1-2) in the base 11, and a body pivoting member 142 for electrically connecting to a body electrical device (not shown in FIGS. 1-2) in the body 12. Wherein, the base pivoting member 141 is coupled (for example fixedly connected) to the base 11, and the body pivoting member 142 is coupled to the body 12. The base pivoting member 141 has a base conductive part 1411, and the body pivoting member 142 has a body conductive part 1421. The base conductive part 1411 and the body conductive part 1421 are rotatably and electrically connected in the rotating shaft 13. The electrical connection between the base conductive part 1411 and the body conductive part 1421 makes the base electrical device be electrically connected to the body electrical device. When the child safety seat 100 according to the disclosure rotates, the base conductive part 1411 and the body conductive part 1421 will rotate with the rotation of the base 11 and the body 12. Since the body pivoting member 142 is coupled to the body 12, and the base pivoting member 141 is coupled to the base 11, the body pivoting member 142 is in a stationary state in respect to the body electrical device, and the base pivoting member 141 is also in a stationary state in respect to the base electrical device. On the one hand, the base electrical device and the body electrical device are coupled to each other by the electrical pivoting structure 14, since there is no cable between the base electrical device and the body electrical device, cable winding will not occur, which can completely solve the winding problem caused by the use of cables in the prior art. On the other hand, the body electrical device and the body pivoting member 142 are electrically connected to each other by a cable, the base electrical device and the base pivoting member 141 are also electrically connected to each other by a cable, such that the body pivoting member 142 is in a static state in respect to the body electrical device, and the base pivoting member 141 is also in a static state in respect to the base electrical device. Both the cable connected between the body pivoting member 142 and the body electrical device and the cable coupled between the base pivoting member 141 and the base electrical device are stationary, that is, the cables will not move with the rotation of the child safety seat 100, and will not be winded. In this way, the problem of winding caused by the use of cables in the related art may be completely solved. Therefore, the child safety seat 100 according to the disclosure is totally different from that in the related art in which the electrical devices are electrically connected to each other by directly using cables, while based on the present disclosure, the electrical devices are electrically connected to each other by the electrical pivoting structure 14, which is simple in structure and can avoid cable winding, and is suitable for widespread promotion and use.

Referring to FIGS. 2-5, the base conductive part 1411 and the body conductive part 1421 according to the disclosure form a pluggable structure which is conductive and rotatable. More specifically, the body conductive part 1421 has a conductive depression structure 143, and the base conductive part 1411 has a conductive protrusion structure 144 which may be plugged into and unplugged from the depression structure 143, so the pluggable structure may be formed by the depression structure 143 and the protrusion structure 144. In order to protect the conductor, the depression structure 143 is covered with a first insulating shell 14111, and the base pivoting member 141 under the protrusion structure 144 is covered with a second insulating shell 14211, that is, the protrusion structure 144 is protruded out of the second insulating shell 14211. The protrusion structure 144 may be plugged into and unplugged from the depression structure 143. The depression structure 143 has a depressed seat 1431 at its bottom, and the protrusion structure 144 has a tapered portion 1441 being cooperative with the depressed seat 1431 at its top. The tapered portion 1441 has a chamfered structure, and the chamfered structure has a certain guiding effect, which facilitates plugging the protrusion structure 144 into the depression structure 143. After the protrusion structure 144 is plugged into the depression structure 143, the second insulating shell 14211 and the first insulating shell 14111 are in an abutting contact, and the abutting contact is smooth in structure. Of course, the depression structure 143 may also be disposed on the base conductive part 1411, and the conductive protrusion structure 144 being pluggable in the depression structure 143 may be disposed on the body conductive part 1421.

Figure 3:
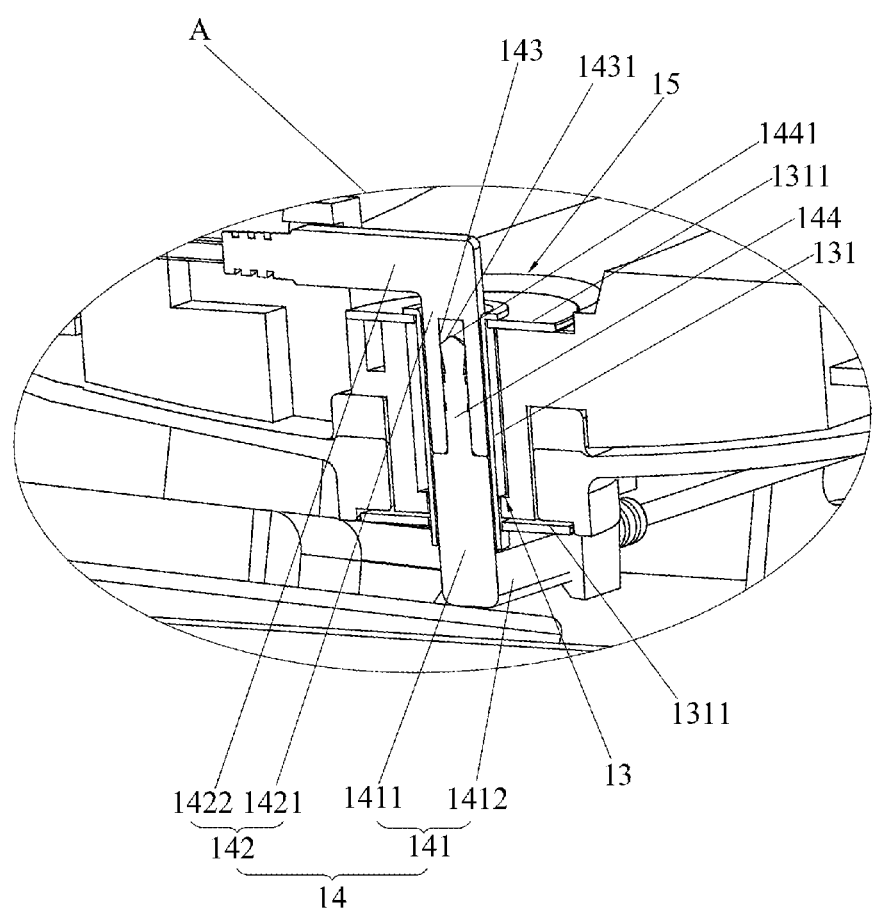
FIG. 3 is an enlarged view of the part A in FIG. 2.
Figure 4:
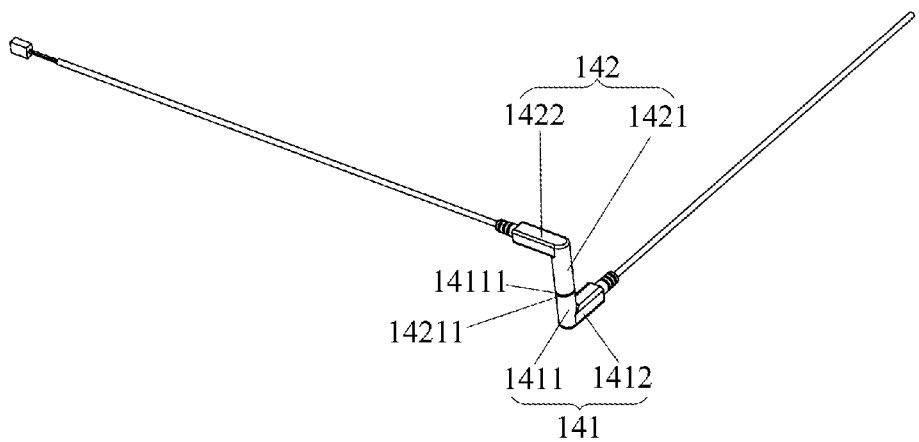
FIG. 4 a schematic structural view of an electrical pivoting structure according to the disclosure.
Figure 5:
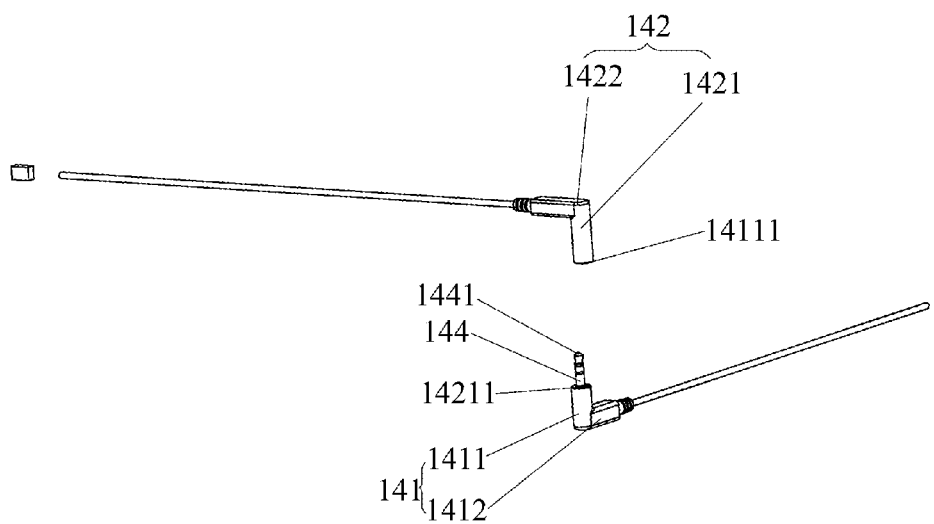
FIG. 5 is an exploded schematic structural view of the electrical pivoting structure according to the disclosure.

Referring to FIG. 3, the rotating shaft 13 connected between the base 11 and the body 12 has a rotating shaft body 131 with a hollow structure. Two ends of the rotating shaft body 131 extend outwardly so as to form a shoulder 1311 respectively, while the body 12 is provided with a mounting hole 15 which is cooperative with the rotating shaft 13 in a position at which the body 12 is rotatably connected to the base 11. The rotating shaft 13 is mounted in the mounting hole 15, and the base conductive part 1411 and the body conductive part 1421 are accommodated in the hollow structure of the rotating shaft 13. Furthermore, in addition to the body conductive part 1421, the body pivoting member 142 also includes a body connecting part 1422 for connecting with the body 12. The plane where the body connecting part 1422 is located is orthogonal to the plane where the body conductive part 1421 is located. Similarly, in addition to the base conductive part 1411, the base pivoting member 141 also includes a base connecting part 1412 for connecting with the base 11. The plane where the base connecting part 1412 is located is orthogonal to the plane where the base conductive part 1411 is located. Such orthogonal arrangement can make rotation of the base conductive part 1411 and the body conductive part 1421 smooth.

Preferably, the body electrical device according to the disclosure may be a detection device for detecting whether a top strap of the body 12 is tightened, and the base electrical device may be an indicator for displaying tightening state information of the top strap. When in use, the user can clearly know whether the top strap is in a tightened state according to the indicator. When the top strap is tightened, the indicator shows green, and when the top strap is in a non-tightened state, the indicator shows red.

It would be noted, specific structures of the base 11 and the body 12 of the child safety seat 100 involved in the disclosure are well known to those skilled in the art, and will not be described in detail here.

The foregoing provides only preferred embodiments of the disclosure, and the scope of the disclosure is not limited by the foregoing disclosure. Any equivalent changes made according to the scope of the disclosure still are within the scope of this disclosure.

What is claimed is:

1. A child safety seat, comprising:
   a base; and
   a body, rotatably connected to the base for providing a seating space, the base being rotatably connected to the body via a rotating shaft,
   an electrical pivoting structure comprising a base pivoting member for electrically connecting to a base electrical device in the base, and a body pivoting member for electrically connecting to a body electrical device in the body;
   the base pivoting member is coupled to the base, the base pivoting member has a base conductive part;
   the body pivoting member is coupled to the body, the body pivoting member has a body conductive part; and
   the base conductive part and the body conductive part are rotatably and electrically connected in the rotating shaft, the base electrical device and the body electrical device are electrically connected to each other via electrical connection of the base conductive part and the body conductive part.

2. The child safety seat according to claim 1, wherein the base conductive part and the body conductive part form a pluggable structure which is conductive and rotatable.

3. The child safety seat according to claim 2, wherein one of the base conductive part and the body conductive part has a conductive depression structure, and the other of the base conductive part and the body conductive part has a conductive protrusion structure being able to be plugged into and unplugged from the depression structure.

4. The child safety seat according to claim 3, wherein the conductive depression structure is covered with a first insulating shell, the conductive protrusion structure is protruded out of a second insulating shell, the conductive protrusion structure is plugged into the conductive depression structure, and the second insulating shell and the first insulating shell are in an abutting contact.

5. The child safety seat according to claim 4, wherein the abutting contact of the second insulating shell and the first insulating shell is smooth in structure.

6. The child safety seat according to claim 4, wherein a bottom of the conductive depression structure is provided with a depressed seat, and a top of the conductive protrusion structure is provided with a tapered portion being cooperative with the depressed seat.

7. The child safety seat according to claim 6, wherein the tapered portion has a chamfered structure.

8. The child safety seat according to claim 1, wherein the base pivoting member is electrically connected to the base electrical device via a cable.

9. The child safety seat according to claim 1, wherein the body pivoting member is electrically connected to the body electrical device via a cable.

10. The child safety seat according to claim 1, wherein the rotating shaft includes a rotating shaft body having a hollow structure, and two ends of the rotating shaft body extend outwardly so as to form a shoulder respectively.

11. The child safety seat according to claim 10, wherein the base conductive part and the body conductive part are accommodated in the hollow structure of the rotating shaft.

12. The child safety seat according to claim 10, wherein the body is provided with a mounting hole being cooperative with the rotating shaft in a position at which the body and the base are rotatably connected, and the rotating shaft is mounted in the mounting hole.

13. The child safety seat according to claim 1, wherein the body pivoting member further includes a body connecting part for connecting with the body, and a plane where the body connecting part is located is orthogonal to a plane where the body conductive part is located.

14. The child safety seat according to claim 1, wherein the base pivoting member further includes a base connecting part for connecting with the base, and a plane where the base connecting part is located is orthogonal to a plane where the base conductive part is located.

15. The child safety seat according to claim 1, wherein the body electrical device is a detection device for detecting whether a top strap is tightened, and the base electrical device is an indicator for displaying tightening state information of the top strap.

* * * * *

UNITED STATES PATENT AND TRADEMARK OFFICE
CERTIFICATE OF CORRECTION

| | |
|---|---|
| PATENT NO. | : 11,639,120 B2 |
| APPLICATION NO. | : 17/476695 |
| DATED | : May 2, 2023 |
| INVENTOR(S) | : Zujian Liu |

It is certified that error appears in the above-identified patent and that said Letters Patent is hereby corrected as shown below:

On the Title Page

Column 1, in Item (73), under "Assignee", delete "BABMINO PREZIOSO SWITZERLAND AG" and insert --BAMBINO PREZIOSO SWITZERLAND AG--

Signed and Sealed this
Sixth Day of June, 2023

Katherine Kelly Vidal
*Director of the United States Patent and Trademark Office*